US012502863B2

(12) United States Patent
Nissato et al.

(10) Patent No.: US 12,502,863 B2
(45) Date of Patent: Dec. 23, 2025

(54) DECORATIVE SHEET AND DECORATIVE MEMBER (71) Applicant: Dai Nippon Printing Co., Ltd., Tokyo (JP)

(72) Inventors: Emi Nissato, Tokyo (JP); Hironaga Usui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/832,537

(22) PCT Filed: Mar. 17, 2023

(86) PCT No.: PCT/JP2023/010771
§ 371 (c)(1),
(2) Date: Jul. 24, 2024

(87) PCT Pub. No.: WO2023/176981
PCT Pub. Date: Sep. 21, 2023

(65) Prior Publication Data
US 2025/0100245 A1    Mar. 27, 2025

(30) Foreign Application Priority Data

Mar. 17, 2022 (JP) ................................ 2022-043129
Oct. 20, 2022 (JP) ................................ 2022-168444

(51) Int. Cl.
*B32B 3/10* (2006.01)
*B32B 3/14* (2006.01)
(Continued)

(52) U.S. Cl.
CPC ................. *B32B 3/10* (2013.01); *B32B 3/14* (2013.01); *B32B 3/16* (2013.01); *B32B 3/22* (2013.01); *B32B 7/05* (2019.01)

(58) Field of Classification Search
CPC .... B32B 3/10; B32B 3/14; B32B 3/16; B32B 3/22; B32B 7/05
(Continued)

(56) References Cited

U.S. PATENT DOCUMENTS

2007/0116933 A1* 5/2007 Kobayashi ............... B44F 9/02
428/172

FOREIGN PATENT DOCUMENTS

JP    2005-178329 A    7/2005
JP    2014-184675 A    10/2014
(Continued)

OTHER PUBLICATIONS

International Preliminary Report on Patentability dated Sep. 10, 2024, issued on corresponding PCT/JP2023/010771.

*Primary Examiner* — Betelhem Shewareged
(74) *Attorney, Agent, or Firm* — Troutman Pepper Locke LLP (57) ABSTRACT

A decorative sheet includes a first surface and a second surface positioned opposite to the first surface. The first surface includes a first region and a second region that is different from the first region. The decorative sheet includes a surface protective layer, a design layer, and a substrate in order from the first surface toward the second surface. The design layer includes a patterned portion disposed only in a location that overlaps the first region. An average skewness Ssk1 of the first region and the average skewness Ssk2 of the second region satisfy a relationship (i), shown below. An average kurtosis Sku1 of the first region A1 and an average kurtosis Sku2 of the second region satisfy a relationship (ii), shown below $$0 < Ssk2 < Ssk1 < 1 \quad (i)$$
$$3 < Sku2 < Sku1 < 5. \quad (ii)$$

10 Claims, 2 Drawing Sheets

(51) Int. Cl.
*B32B 3/16* (2006.01)
*B32B 3/22* (2006.01)
*B32B 7/05* (2019.01)

(58) Field of Classification Search
USPC .......................................................... 428/203
See application file for complete search history.

(56) References Cited

FOREIGN PATENT DOCUMENTS

| | | |
|---|---|---|
| JP | 2015-171810 A | 10/2015 |
| JP | 2021-054045 A | 4/2021 |

* cited by examiner

DECORATIVE SHEET AND DECORATIVE MEMBER

TECHNICAL FIELD

The present disclosure relates to a decorative sheet and a decorative member.

BACKGROUND ART

Decorative sheets are laminated on various members for decorative purposes. Examples of the various members include surfaces of walls of buildings; surfaces of interior spaces, such as floors and ceilings; surfaces of fixture members, such as spandrel walls, moldings, and lintels; surfaces of exteriors of buildings, such as outer walls, roofs, cases for sliding doors, and soffits; surfaces of outdoor structures, such as fences and walls; surfaces of interiors and exterior portions of fittings, such as window frames, door frames, doors, and partitions; surfaces of pieces of furniture, such as chests of drawers and cabinets; inner surfaces and outer surfaces of vehicles, such as automobiles, railroad vehicles, ships, and aircraft; and surfaces of various home appliances and office equipment.

A basic structure of decorative sheets includes a substrate, a design layer, and a surface protective layer that are disposed in this order. Decorative sheets including only a substrate, a design layer, and a surface protective layer have a poor tactile feel. If the design shown by the decorative sheet has a high gloss, the design may be compromised. In recent years, proposals have been made to improve the tactile feel and the gloss provided by a decorative sheet, and such proposals are described, for example, in Japanese Unexamined Patent Application Publication No. 2005-178329, Japanese Unexamined Patent Application Publication No. 2015-171810, Japanese Unexamined Patent Application Publication No. 2014-184675, and Japanese Unexamined Patent Application Publication No. 2021-54045.

The decorative sheets described in Japanese Unexamined Patent Application Publication No. 2005-178329, Japanese Unexamined Patent Application Publication No. 2015-171810, Japanese Unexamined Patent Application Publication No. 2014-184675, and Japanese Unexamined Patent Application Publication No. 2021-54045 are provided with a low gloss, and, as a result, a protruded raised portion is formed in the decorative sheets. The raised portion has a tactile feel imparted thereto. There is a need for a portion without a low gloss to also have a tactile feel imparted thereto. In particular, there is a need for an appropriate difference in the tactile feel to exist between the portion with a low gloss and the portion without a low gloss. In an instance where, for example, a decorative sheet shows a design of a wood grain pattern, the low gloss is provided in a portion that shows the pattern of vessels. In such decorative sheets, there is a need for an appropriate difference in the tactile feel to exist between the portion showing the pattern of vessels and the portion showing a pattern other than the pattern of vessels.

DISCLOSURE OF INVENTION

An object of the present disclosure is to impart appropriate tactile feels to a decorative sheet while reducing the gloss of the decorative sheet.

An embodiment of the present disclosure relates to [1] to described below.

[1]

A decorative sheet comprising a first surface and a second surface positioned opposite to the first surface, wherein
  the first surface comprises a first region and a second region that is different from the first region,
  the decorative sheet comprises a surface protective layer, a design layer, and a substrate in order from the first surface toward the second surface,
  the design layer comprises a patterned portion disposed only in a location that overlaps the first region,
  an average 60° specular gloss measured on the first surface is 6 or less,
  an average 85° specular gloss measured on the first surface is 9 or less,
  an average skewness Ssk1 of the first region and an average skewness Ssk2 of the second region, in accordance with a definition in ISO 25178-2:2012, satisfy a relationship (i), shown below, and
  an average kurtosis Sku1 of the first region and an average kurtosis Sku2 of the second region, in accordance with a definition in ISO 25178-2:2012, satisfy a relationship (ii), shown below.

$$0 < Ssk2 < Ssk1 < 1 \quad \text{(i)}$$

$$3 < Sku2 < Sku1 < 5 \quad \text{(ii)}$$

[2]

The decorative sheet according to [1], further comprising a low-gloss portion that overlaps the patterned portion, wherein
  the surface protective layer comprises a binder resin and first particles held by the binder resin.

[3]

The decorative sheet according to [2], wherein the low-gloss portion comprises inorganic particles.

[4]

The decorative sheet according to [2] or [3], wherein some of the first particles project from the binder resin.

[5]

The decorative sheet according to [4], wherein a number of first particles that project from the binder resin in a location that overlaps the first region is greater than a number of first particles that project from the binder resin in a location that overlaps the second region.

[6]

The decorative sheet according to any one of [2] to [5], wherein an average particle size of the first particles is greater than an average length between the first surface and the low-gloss portion.

[7]

The decorative sheet according to any one of [2] to [6], wherein an average length between the first surface and the low-gloss portion is 3 μm or greater and 12 μm or less.

[8]

The decorative sheet according to any one of [1] to [7], wherein the substrate comprises paper.

[9]

The decorative sheet according to [8], further comprising a primer layer disposed between the substrate and the surface protective layer.

A decorative member comprising:
  the decorative sheet according to any one of [1] to [9]; and
  a support member supporting the decorative sheet.

With the present disclosure, appropriate tactile feels can be imparted to a decorative sheet while the gloss of the decorative sheet is reduced.

DESCRIPTION OF EMBODIMENTS

An embodiment of the present disclosure will now be described with reference to the drawings. In the drawings attached to this specification, scales, aspect ratios, and the like have been appropriately changed from those of actual products for exaggeration and to facilitate illustration and ease of understanding.

Figure 1:
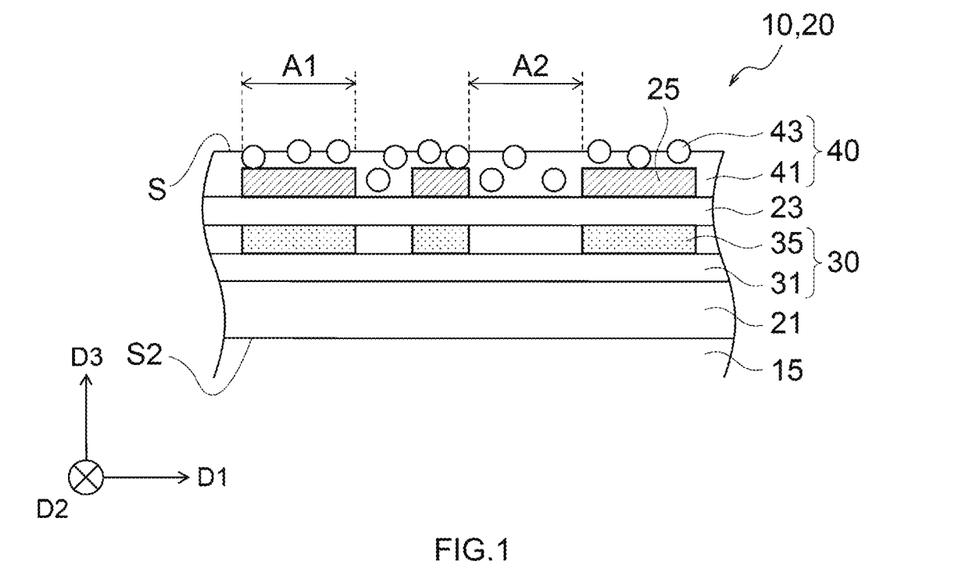
FIG. 1 illustrates an embodiment of the present disclosure and is a schematic cross-sectional view of an example of a decorative member and a decorative sheet.
Figure 2:
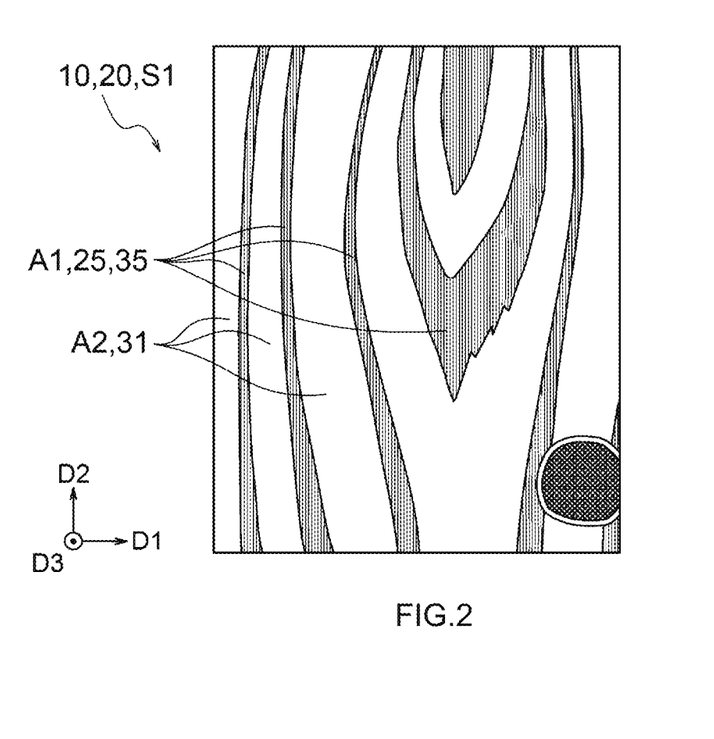
FIG. 2 is a plan view of the decorative member and the decorative sheet of FIG. 1.

To clarify the relationship of directions between the figures, arrows with common reference characters are used in some of the figures, to illustrate common directions, namely, a first direction D1, a second direction D2, and a third direction D3. In FIG. 1, a circle symbol containing "x" indicates an arrow that is perpendicular to the page of the figure and points into the page of the figure. In FIG. 2, a circle symbol containing a dot indicates an arrow that is perpendicular to the page of the figure and points out of the page. In the illustrated examples, the third direction D3 is a direction normal to a decorative sheet 20. The third direction D3 is a direction in which major constituent elements that form the decorative sheet 20 are stacked. The illustrated decorative sheet 20, which is planar, extends in the first direction D1 and the second direction D2. The first direction D1, the second direction D2, and the third direction D3 are orthogonal to one another.

[Decorative Member and Decorative Sheet]

A decorative member and a decorative sheet of an embodiment are ones referred to as a "low-gloss" member or sheet. The decorative member is configured to have a low average 60° specular gloss and a low average 85° specular gloss, and, consequently the decorative member can have a low gloss and, therefore, present a texture of a natural material more faithfully.

FIG. 1 illustrates an example of a cross-sectional view of a decorative member 10 and the decorative sheet 20. In the example illustrated in FIG. 1, the decorative member 10 includes a support member 15 and the decorative sheet 20. The support member 15 is a body over which the decorative sheet 20 is applied. The decorative sheet 20 shows a design. The support member 15 has the design imparted by the decorative sheet 20. Examples of a material of the support member 15 include wood members, metal members, members made of a non-metallic mineral material, and resin members. The wood members may be plate members, three-dimensional articles, or the like, and examples of the wood members include wood veneer sheets, plywood sheets, particle boards, medium-density fiberboards (MDF), and wood fiberboards made of engineered wood or the like. The wood members may be made of any of a variety of woods, such as cedar, Japanese cypress, pine, and lauan. The metal members may be plate members, steel sheets, three-dimensional articles, sheets, or the like and may be made of iron, aluminum, or the like. The members made of a non-metallic mineral material may be plate members, three-dimensional articles, or the like and may be made of a non-cement, non-metallic mineral material, such as glass, a ceramic such as porcelain, or gypsum or be made of a non-porcelain, non-metallic mineral material, such as an autoclaved lightweight aerated concrete (ALC) plate. The resin members may be plate members, three-dimensional articles, sheets, or the like and may be made of an acrylic resin, a polyester resin, a polyolefin resin such as a polystyrene or a polypropylene, an ABS (acrylonitrile-butadiene-styrene copolymer) resin, a phenolic resin, a vinyl chloride-based resin, a cellulose resin, or a rubber.

The decorative member 10 may further include an adhesive layer, which is not illustrated, between the support member 15 and the decorative sheet 20 in the third direction D3. The adhesive layer includes, for example, an adhesive and a resin.

The adhesive for use in the adhesive layer is not particularly limited. The adhesive for use in the adhesive layer may be an adhesive known in the art. The adhesive for use in the adhesive layer may be an adhesive such as a heat-sensitive adhesive or a pressure-sensitive adhesive. The resin for use in the adhesive may be an acrylic resin, a urethane resin, a vinyl chloride resin, a vinyl acetate resin, a vinyl chloride-vinyl acetate copolymer resin, a styrene-acrylic copolymer resin, a polyester resin, a polyamide resin, or the like. The resin for use in the adhesive may include one of these or two or more of these. The resin for use in the adhesive may be a polyurethane-based or polyester-based two-component curable adhesive that uses an isocyanate compound or the like as a curing agent. A tackifier may be used in the adhesive layer. The tackifier may be appropriately selected from acrylic-based tackifiers, urethane-based tackifiers, silicone-based tackifiers, rubber-based tackifiers, and the like.

The adhesive layer may be produced as follows. Any of the above-mentioned resins is made into an applicable form, and the resultant, which may be a solution, an emulsion, or the like, is applied and dried. The application may be carried out, for example, by gravure printing, screen printing, or reverse coating with a gravure cylinder. The adhesive layer may have any thickness. The thickness of the adhesive layer may be 1 μm or greater and 100 μm or less, 5 μm or greater and 50 μm or less, or 10 μm or greater and 30 μm or less, so that excellent adhesion can be achieved.

FIG. 2 illustrates an example of the design provided by the decorative sheet 20. The decorative sheet 20, illustrated in FIG. 2, shows a design of a wood grain pattern appearing in a cross section of a tree. The tree that is shown by the decorative sheet 20 is not particularly limited. The tree shown by the decorative sheet 20 may be, for example, a cedar, Japanese cypress, walnut, pine, or cherry tree. The decorative sheet 20 may show a bark of a tree. The decorative sheet 20 may show a surface or a cross section of a tree. In particular, the decorative sheet 20 can show a cross section of a wood product, such as a veneer sheet or a plywood sheet.

The decorative sheet 20 includes a first surface S1 and a second surface S2. The second surface S2 is positioned opposite to the first surface S1. The first surface S1 and the second surface S2 are major surfaces of the decorative sheet 20. The first surface S1 includes a first region A1 and a second region A2. The second region A2 is different from the first region A1 in plan view of the decorative sheet 20. The second region A2 does not overlap the first region A1 in at least one of the first direction D1 and the second direction D2. In the illustrated example, the second region A2 adjoins the first region A1. In the example illustrated in FIG. 2, the first region A1 shows a pattern darker than the pattern of the second region A2. The first region A1 extends in a striated form. Specifically, the first region A1 represents patterns appearing in a cross section of a tree, such as patterns of vessels, knots, earlywood, and/or latewood, and the second region A2 represents a pattern appearing in the cross section of the tree other than the foregoing patterns. The decorative sheet 20 may further include a third region that is different from both the first region A1 and the second region A2.

In the example illustrated in FIG. 1, the decorative sheet 20 includes a surface protective layer 40, a low-gloss portion 25, a primer layer 23, a design layer 30, and a substrate 21 in order from the first surface S1 toward the second surface S2. The surface protective layer 40 constitutes the first surface S1 of the decorative sheet 20.

In the decorative sheet 20 of the present embodiment, the first surface S1 has average specular glosses, average skewnesses, and average kurtosises that are adjusted as follows. The specular glosses are defined in JIS Z 8741:1997. The skewness and kurtosis are defined in ISO 25178-2:2012.

An average 60° specular gloss measured on the first surface S1: 6 or less

An average 85° specular gloss measured on the first surface S1: 9 or less

A relationship between an average skewness Ssk1 of the first region A1 and an average skewness Ssk2 of the second region A2: $0<Ssk2<Ssk1<1$ A relationship between an average kurtosis Sku1 of the first region A1 and an average kurtosis Sku2 of the second region A2: $3<Sku2<Sku1<5$ Because of the adjustments made to the specular glosses of the first surface S1 of the decorative sheet 20, the decorative sheet 20 can have a reduced gloss. Consequently, the decorative sheet 20 can show an excellent design, which may be, for example, a faithful reproduction of a natural material, such as a wood grain. Because of the adjustments made to the skewness and the kurtosis of the first region A1 and the second region A2 of the decorative sheet 20, the first surface S1 of the decorative sheet 20 is formed to be an uneven surface including high, thin, and sharp peaks or projections, and an entire area of the decorative sheet 20 has appropriate tactile feels imparted thereto. Because of the adjustment made to the relationship between the skewnesses and the kurtosises of the first region A1 and the second region A2 of the decorative sheet 20, the first region A1 is formed to have higher and sharper peaks or projections than the second region A2, and, accordingly, the tactile feel imparted to the first region A1 is differentiated from the tactile feel imparted to the second region A2. The tactile feel imparted to the first region A1 is stronger than the tactile feel imparted to the second region A2. For example, the portion showing the pattern of vessels of a wood grain pattern has a tactile feel stronger than that of the portion showing a pattern other than the pattern of vessels. Accordingly, the decorative sheet 20 has appropriate tactile feels imparted thereto and has a reduced gloss.

Each of the constituent elements of the decorative sheet 20 will be described below.

<Substrate>

The substrate 21 may have a planar shape and may be, for example, a film, a sheet, or a plate. Regarding the film, the sheet, and the plate, the term "film" is often used for a material that is relatively the thinnest, the term "sheet" is often used for a material that is relatively the second thinnest, and the term "plate" is often used for a material that is relatively the thickest. In the present specification, these three terms are considered to be interchangeable unless otherwise indicated.

The substrate 21 supports the design layer 30 and the surface protective layer 40. The substrate 21 may have any shape and dimensions. The shape and the dimensions of the substrate 21 may be appropriately selected in accordance with an application, desired properties, and processability. In instances where the substrate 21 is a film, a sheet, or a plate that has a planar shape, the thickness of the substrate 21 is not particularly limited. Typically, the thickness of the substrate 21 may be specified to be approximately 10 µm or greater and 10 cm or less from the standpoint of manufacturability, mechanical strength, handleability, and cost-effectiveness. The thickness of the substrate 21 may be 20 µm or greater and 300 µm or less. The thickness of the substrate 21 may be 1 mm or greater and 2 cm or less.

Examples of a material of the substrate 21 include resins, metals, non-metallic inorganic materials, fibrous materials, and wood-based materials. The material of the substrate 21 may be appropriately selected in accordance with an application.

The substrate 21 may be a single layer. The substrate 21 may be formed of a stack of multiple layers made of any of the above-mentioned materials. When the substrate is a multilayer body formed of multiple layers stacked on one another, the stacked multiple layers may be made of different respective materials, and, consequently, different properties of the materials of the respective layers may complement one another. The substrate 21 that is a multilayer body formed of multiple layers stacked on one another may be, for example, any of A to J, described below.

(A) A multilayer body formed of a resin and a wood-based material (B) A multilayer body formed of a resin and a metal (C) A multilayer body formed of a resin and a fibrous material (D) A multilayer body formed of a resin and a non-metallic inorganic material (E) A multilayer body formed of a resin 1 and a resin 2

(F) A multilayer body formed of a metal and a wood-based material (G) A multilayer body formed of a metal and a non-metallic inorganic material (H) A multilayer body formed of a metal and a fibrous material (I) A multilayer body formed of a metal 1 and a metal 2

(J) A multilayer body formed of a non-metallic inorganic material and a fibrous material Regarding E, the resin 1 and the resin 2 may be resins different from each other. For example, the resin 1 may be an olefin resin, and the resin 2 may be an acrylic resin. Regarding H, the metal 1 and the metal 2 may be metals different from each other. For example, the metal 1 may be copper, and the metal 2 may be chromium.

When the substrate 21 is a multilayer body such as any of A to J, described above, the multilayer body may include a layer for enhancing adhesion (e.g., an adhesive layer), between two adjacent constituent layers.

The resin for use in the substrate 21 is, for example, any of a variety of synthetic or natural resins. The synthetic resins are, for example, cured products of a thermoplastic resin or of a curable resin composition.

Examples of the thermoplastic resin include olefin resins, such as polyethylene, polypropylene, polymethylpentene, ionomers, and various olefinic thermoplastic elastomers; vinyl chloride-based resins, such as polyvinyl chloride, polyvinylidene chloride, and vinyl chloride-vinyl acetate copolymers; polyester resins, such as polyethylene terephthalate, polybutylene terephthalate, polyethylene naphthalate, ethylene glycol-terephthalic acid-isophthalic acid copolymers, and polyester-based thermoplastic elastomers; acrylic resins, such as polymethyl (meth)acrylate, polyethyl (meth)acrylate, polybutyl (meth)acrylate, and methyl (meth) acrylate-butyl (meth)acrylate copolymers; polyamide resins typified by nylon 6, nylon 66, or the like; cellulosic resins, such as cellulose triacetate, cellophane, and celluloid; styrenic resins, such as polystyrene, acrylonitrile-styrene copolymers, and acrylonitrile-butadiene-styrene copolymers (ABS); polyvinyl alcohols; ethylene-vinyl acetate copolymers; ethylene-vinyl alcohol copolymers; polycarbonate resins; polyarylate resins; and polyimide resins. Examples of the curable resin composition include thermosetting resin compositions and ionizing radiation-curable resin compositions. Examples of the natural resins include natural rubbers, pine resins, and amber.

The thermosetting resin composition is a composition including at least a thermosetting resin and cures when heated. Examples of the thermosetting resin include acrylic resins, urethane resins, phenolic resins, urea-melamine resins, epoxy resins, unsaturated polyester resins, and silicone resins. The thermosetting resin composition includes a thermosetting resin and may additionally include, if necessary, a curing agent, a curing catalyst, and/or the like added thereto.

The thermosetting resin composition is, for example, a two-component curable composition including a polyol-based resin as a base resin and including an isocyanate-based compound as a curing agent. Examples of the polyol-based resin include acrylic polyols and polyester polyols.

Examples of the ionizing radiation-curable resin compositions include electron beam-curable resin compositions and UV curable resin compositions.

The ionizing radiation-curable resin composition includes a compound containing an ionizing radiation-curable functional group (hereinafter also referred to as an "ionizing radiation-curable compound". The ionizing radiation-curable functional group is a group that is crosslinked and cured when irradiated with ionizing radiation. The ionizing radiation-curable functional group is, for example, a functional group containing an ethylenic double bond, such as a (meth)acryloyl group, a vinyl group, or an allyl group. The ionizing radiation-curable functional group may be, for example, an epoxy group and/or an oxetanyl group.

In the present specification, the "(meth)acryloyl group" refers to an "acryloyl group or a methacryloyl group". In the present specification, the "(meth)acrylate" refers to an "acrylate or a methacrylate". The "ionizing radiation" refers to radiation that is an electromagnetic wave or a charged particle beam and has an energy quantum that can cause polymerization or crosslinking of molecules. The ionizing radiation is, for example, ultraviolet radiation (UV) or an electron beam (EB). For example, the ionizing radiation may be an electromagnetic wave such as X-rays or γ-rays or may be a charged particle beam such as α-rays or an ion beam.

The ionizing radiation-curable compound may, specifically, be appropriately selected from among polymerizable monomers and polymerizable oligomers (also referred to as a "polymerizable prepolymer") that are conventionally used as ionizing radiation-curable resins.

The ionizing radiation-curable compound may be a compound containing two or more ethylenically unsaturated bond groups. The ionizing radiation-curable compound may be a multifunctional (meth)acrylate-based compound containing two or more ethylenically unsaturated bond groups. The multifunctional (meth)acrylate-based compound may be a monomer or an oligomer.

The multifunctional (meth)acrylate-based compound may be a bifunctional (meth)acrylate-based monomer or a tri- or higher functional (meth)acrylate-based monomer. Examples of the bifunctional (meth)acrylate-based monomer include ethylene glycol di(meth)acrylate, bisphenol A tetraethoxy diacrylate, bisphenol A tetrapropoxy diacrylate, and 1,6-hexanediol diacrylate. Examples of the tri- or higher functional (meth)acrylate-based monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanurate-modified tri(meth)acrylate. Examples of the multifunctional (meth)acrylate-based oligomer include acrylate-based polymers, examples of which include urethane (meth)acrylates, epoxy (meth)acrylates, polyester (meth)acrylates, and polyether (meth)acrylates.

The urethane (meth)acrylates can be prepared, for example, by a reaction between a polyhydric alcohol and an organic diisocyanate and further with a hydroxy(meth)acrylate.

Preferred epoxy (meth)acrylates are (meth)acrylates prepared by reacting a tri- or higher functional aromatic epoxy resin, alicyclic epoxy resin, aliphatic epoxy resin, or the like with a (meth)acrylic acid; (meth)acrylates prepared by reacting a bi- or higher functional aromatic epoxy resin, alicyclic epoxy resin, aliphatic epoxy resin, or the like with a polybasic acid and with a (meth)acrylic acid; and (meth)acrylates prepared by reacting a bi- or higher functional aromatic epoxy resin, alicyclic epoxy resin, aliphatic epoxy resin, or the like with a phenol and with a (meth)acrylic acid.

The ionizing radiation-curable resins mentioned above may be used alone or in a combination of two or more.

In instances where the ionizing radiation-curable compound is a UV curable compound, the ionizing radiation-curable resin composition may include one or more additives such as a photopolymerization initiator and a photopolymerization accelerator. The photopolymerization initiator may be at least one selected from acetophenone, benzophenone, α-hydroxyalkylphenone, Michler's ketone, benzoin, benzil dimethylketal, benzoylbenzoate, α-acyloxime esters, thioxanthones, and the like. The photopolymerization accelerator can reduce polymerization inhibition due to air during curing, thereby increasing the curing speed. The photopolymerization accelerator may be, for example, at least one selected from isoamyl p-dimethylaminobenzoate, ethyl p-dimethylaminobenzoate, and the like.

The metal for use in the substrate 21 is, for example, aluminum or an aluminum-containing alloy, such as duralumin; iron or an iron-containing alloy, such as carbon steel or stainless steel; copper or a copper-containing alloy, such as brass or bronze; gold; silver; chromium; nickel; cobalt; tin; titanium; or the like. The substrate 21 may include a coating layer formed of a coating of any of these metals.

The non-metallic inorganic material for use in the substrate 21 is, for example, a non-ceramic-based non-metallic mineral material, such as cement, autoclaved lightweight aerated concrete (ALC), gypsum, calcium silicate, or wood chip cement; a ceramic-based non-metallic mineral material, such as porcelain, earthenware, glass, or enamelware; natural rock, such as limestone, marble, granite, or andesite; or the like.

The fibrous material for use in the substrate 21 is, for example, paper, such as thin paper, Kraft paper, high-quality paper, Japanese paper, titanium paper, linter paper, sulfate paper, waxed paper, parchment paper, Glassine paper, backing paper for wallpaper, paperboard, or paper for a gypsum board; or a woven or nonwoven fabric made from a fiber, such as silk, cotton, hemp, a polyester resin fiber, an acrylic resin fiber, a glass fiber, or a carbon fiber. The paper may further contain a resin, such as an acrylic resin, a styrene-butadiene rubber, a melamine resin, or a urethane resin, added thereto to increase the fiber-fiber strength of the paper substrate and/or prevent the fraying of the paper substrate. Examples of the paper containing a resin added thereto include paper with increased interlayer strength and resin-impregnated paper. A substrate formed of a fibrous material layer and a resin layer disposed thereon is, for example, a wallpaper web or the like in which a resin layer, such as a vinyl chloride resin layer, an olefin resin layer, or an acrylic resin layer, is disposed on a surface of backing paper for wallpaper.

The material of the substrate 21 may include a fibrous material, in particular, paper, which is preferable in terms of environmental considerations and the ease with which the design layer 30 can be provided on the substrate 21.

The substrate 21 may include one or more additives if necessary. In instances where the material of the substrate is a resin, examples of the additives include inorganic fillers, such as calcium carbonate and clay, flame retardants, such as magnesium hydroxide, antioxidants, lubricants, foaming agents, UV absorbers, and light stabilizers. A content of the additives is not particularly limited as long as the content is within a range that does not impair processability and the like, and an appropriate content may be selected in accordance with required properties and the like.

One surface or both surfaces of the substrate 21 may be surface-treated to improve adhesion with another layer that forms the decorative member. Examples of the surface treatment include physical surface treatments and chemical surface treatments, for example oxidizing methods and roughening methods. Examples of the oxidizing methods include corona discharge treatments, chromic acid treatments, flame treatments, hot air treatments, and UV-ozone treatment methods. Examples of the roughening methods include sand blasting methods and solvent treatment methods. Appropriate one or more of these surface treatments are selected in accordance with the type of the substrate. Corona discharge treatments are excellent in terms of the effect of the surface treatment, operability, and the like.

<Design Layer>

The design layer 30 forms the design that is shown by the decorative sheet 20. Examples of the design that may be formed by the design layer 30 include wood grain patterns on a surface of wood plates, such as annual ring patterns and vessel patterns; stone patterns on a surface of stone plates, such as marble patterns and granite patterns; cloth patterns on a surface of fabrics; leather grain patterns on a surface of leathers; tiling patterns including joints; brick laying patterns including joints; sand grain patterns; satin patterns; patterns formed by an arrangement of recessed grooves and protruding ridges that are extending parallel to each other (so-called "parallel line groove-ridge patterns" or "beam engraved patterns"); and abstract patterns, such as geometric patterns, letter patterns, graphic patterns, polka dot patterns, and floral patterns. In the example illustrated in FIG. 2, the design layer 30 forms a design of a wood grain pattern including an annual ring pattern and a vessel pattern. Because of the design layer 30 that forms such a design, the decorative sheet 20 can show a cross section of a wood product, such as a veneer sheet or a plywood sheet.

The design layer 30 is located between the substrate 21 and the surface protective layer 40 in the third direction D3. The design layer 30 includes a colored layer 31 and a patterned portion 35. The colored layer 31 is located on an entire area of the decorative sheet 20. The patterned portion 35 is located only in a location that overlaps the first region A1.

<<Colored Layer and Patterned Portion>>

The colored layer 31 serves as a base for the design formed by the design layer 30. The colored layer 31 is formed of a uniform single-color ink, metal thin film, or the like. The patterned portion 35 is formed of an ink or a metal thin film printed to overlap the colored layer 31. The patterned portion 35 exhibits a color different from the color of the colored layer 31. For example, the patterned portion 35 exhibits a color darker than the color of the colored layer 31. For example, the patterned portion 35 forms a pattern of annual rings and vessels of a surface of a wood plate. In the example illustrated in FIG. 2, the patterned portion 35, together with the colored layer 31, forms a wood grain pattern or the like.

The colored layer 31 and the patterned portion 35 may be formed of inks, which may include a binder resin and one or more components that are appropriately mixed therewith. Examples of the components include colorants, such as pigments and dyes, extender pigments, solvents, stabilizers, plasticizers, catalysts, curing agents, UV absorbers, and light stabilizers. The binder resin that is used in the colored layer 31 and the patterned portion 35 is not particularly limited. Examples of the binder resin include urethane resins, acrylic polyol resins, acrylic resins, ester resins, amide resins, butyral resins, styrene resins, urethane-acrylic copolymers, vinyl chloride-vinyl acetate copolymer resins, vinyl chloride-vinyl acetate-acrylic copolymer resins, chlorinated propylene resins, nitrocellulose resins, and cellulose acetate resins. The binder resin may be any of various types of resins, such as a one-component curable resin or a two-component curable resin in which one of the components is a curing agent, such as an isocyanate compound.

The colorant is not particularly limited. Examples of the colorant include inorganic pigments, such as carbon black (India ink), black iron oxide, titanium white, antimony white, chrome yellow, titanium yellow, red iron oxide, cadmium red, ultramarine blue, and cobalt blue; organic pigments or dyes, such as quinacridone red, isoindolinone yellow, nickel azo complexes, phthalocyanine blue, and azomethine azo black; metallic pigments, such as those made of flake-shaped pieces of foil, such as aluminum foil or brass foil; and pearlescent (pearl) pigments, such as those made of flake-shaped pieces of foil, such as titanium dioxide coated mica foil and basic lead carbonate foil.

A content of the colorant is not particularly limited. The content of the colorant may be adjusted in accordance with a color and a density of the design that is shown by the design layer 30, a material of the colorant, and the like. The content of the colorant may be, for example, 20 parts by mass or greater and 500 parts by mass or less, 50 parts by mass or greater and 300 parts by mass or less, or 70 parts by mass or greater and 200 parts by mass or less, per 100 parts by mass of the binder resin.

The colored layer 31 and the patterned portion 35 may include one or more additives, such as a UV absorber, a light stabilizer, and a colorant. The thickness of the colored layer 31 and the patterned portion 35 may be appropriately selected in accordance with the desired pattern. The thickness of the colored layer 31 and the patterned portion 35 may be selected from the standpoint of hiding the original color of the support member 15 and appropriately forming the design. The thickness of the colored layer 31 and the patterned portion 35 may be, for example, 0.5 μm or greater and 20 μm or less, 1 μm or greater and 10 μm or less, or 2 μm or greater and 5 μm or less.

The colored layer 31 and the patterned portion 35 may be, for example, thin films of an elemental metal, thin films of an alloy, or the like. Examples of the elemental metal include gold, silver, copper, tin, iron, nickel, chromium, and cobalt, and the alloy may include two or more of these elemental metals. Examples of the alloy include brass, bronze, and stainless steel. The thickness of the metal thin films is, for example, 0.1 μm or greater and 1 μm or less.

<Primer Layer>

The primer layer 23 is disposed between the substrate 21 and the surface protective layer 40. The primer layer 23 improves adhesion between the substrate 21 and the surface protective layer 40. The primer layer 23 is provided on an entire area of the design layer 30.

The primer layer 23 is formed primarily of a binder resin and may include one or more additives, such as a UV absorber and a light stabilizer, if necessary. Examples of the binder resin include urethane resins, acrylic polyol resins, acrylic resins, ester resins, amide resins, butyral resins, styrene resins, urethane-acrylic copolymers, polycarbonate-based urethane-acrylic copolymers (urethane-acrylic copolymers derived from a polymer (polycarbonate polyol) containing a carbonate linkage in the polymer backbone and containing two or more hydroxy groups at an end or in a side chain), vinyl chloride-vinyl acetate copolymer resins, vinyl chloride-vinyl acetate-acrylic copolymer resins, chlorinated propylene resins, nitrocellulose resins (cellulose nitrate), and cellulose acetate resins. The binder resin may include one of these or two or more of these. The binder resin may be a resin resulting from crosslinking and curing any of the just-mentioned resins with a curing agent added thereto, such as an isocyanate-based curing agent or an epoxy-based curing agent. The binder resin may be a resin resulting from crosslinking and curing a polyol-based resin, such as an acrylic polyol resin, with an isocyanate-based curing agent, or may be a resin resulting from crosslinking and curing an acrylic polyol resin with an isocyanate-based curing agent.

In instances where the substrate 21 includes paper, the primer layer 23 can stabilize seepage of the surface protective layer 40 into the substrate 21. The primer layer 23 inhibits a thickness of the surface protective layer 40 from becoming an unintended thickness, which may occur if the surface protective layer 40 seeps into the substrate 21, and, consequently, the primer layer 23 inhibits difficulty in causing first particles to project from a binder resin, which will be described later, of the surface protective layer 40. In other words, the primer layer 23 enables a shape of the first surface S1 of the decorative sheet 20 to be an intended shape and enables the production of the decorative sheet 20 in which the texture and the tactile feels of the first surface S1 are stable.

The primer layer 23 may contain a UV absorber and/or a light stabilizer so that weatherability can be improved. The primer layer 23 may contain a widely used UV absorber and light stabilizer.

The thickness of the primer layer 23 may be, for example, 0.01 μm or greater and 10 μm or less, 0.7 μm or greater and 8 μm or less, or 1.0 μm or greater and 6 μm or less.

<Surface Protective Layer>

The surface protective layer 40 constitutes the first surface S1 of the decorative sheet 20. The surface protective layer 40 covers the design layer 30 and the low-gloss portion 25 in the third direction D3. The surface protective layer 40 protects the design layer 30 and the low-gloss portion 25. The surface protective layer 40 is provided on an entire area of the decorative sheet 20. The surface protective layer 40 improves a scratch resistance of the decorative sheet 20.

The surface protective layer 40 includes a binder resin 41 and first particles 43. The first particles 43 are held by the binder resin 41. The surface protective layer 40 may further include second particles that are different from the first particles 43.

<<Binder Resin>>

The binder resin 41 is, for example, a cured product of a thermoplastic resin or of a curable resin composition. Cured products of a curable resin composition have excellent scratch resistance. Preferably, the binder resin 41 includes a cured product of a curable resin composition. A ratio of the cured product of a curable resin composition may be 50 mass % or greater, 70 mass % or greater, 90 mass % or greater, or 100 mass %, based on a total mass of the binder resin 41.

Examples of the thermoplastic resin for use in the binder resin 41 include acrylic resins, cellulosic resins, urethane-based resins, vinyl chloride-based resins, polyester-based resins, polyolefin-based resins, polycarbonates, nylons, polystyrenes, and ABS resins.

Examples of the cured product of a curable resin composition include cured products of a thermosetting resin composition and cured products of an ionizing radiation-curable resin composition. Cured products of a thermosetting resin composition have excellent scratch resistance and excellent contamination resistance. Cured products of a thermosetting resin composition are easy to use in combination with a UV absorber. Cured products of an ionizing radiation-curable resin composition have excellent scratch resistance and excellent contamination resistance. Cured products of an ionizing radiation-curable resin composition are also excellent in terms of maintaining performance over a long period of time.

The cured product of a thermosetting resin composition for use in the binder resin 41 may be the same as the cured product of a thermosetting resin composition for use in the substrate 21, described above. The cured product of an ionizing radiation-curable resin composition for use in the binder resin 41 may be the same as the cured product of an ionizing radiation-curable resin composition for use in the substrate 21, described above.

The binder resin 41 covers the low-gloss portion 25. In the second region A2, in which the low-gloss portion 25 is not provided, the binder resin 41 is in contact with the design layer 30. The low-gloss portion 25 is embedded in the binder resin 41. An average length between the first surface S1 and the low-gloss portion 25 of the decorative sheet 20, which is, in other words, an average thickness of the binder resin 41 in the first region A1, is, for example, 3 μm or greater and 12 μm or less and preferably 7 μm or greater and 9 μm or less. When the binder resin 41 has such a thickness in the first region A1, the first particles 43 can project from the binder resin 41 in a location that overlaps the first region A1. An average length between the first surface S1 and the design layer 30 of the decorative sheet 20, which is, in other words, an average thickness of the binder resin 41 in the second region A2, is, for example, 3 μm or greater and 12 μm or less and preferably 6 μm or greater and 9 μm or less. When the binder resin 41 has such thicknesses in the first region A1 and the second region A2, the number of first particles 43 that project from the binder resin 41 in a location that overlaps the first region A1 can be greater than the number of first particles 43 that project from the binder resin 41 in a location that overlaps the second region A2, as will be described below.

The average length between the first surface S1 and the low-gloss portion 25 is determined, for example, in the following steps, (X1) to (X3).

(X1) A cross-sectional area of the decorative sheet 20 in a direction normal to the decorative sheet is examined. The cross-sectional area has a width of 500 μm or greater and 1500 μm or less in a direction orthogonal to the direction normal to the decorative sheet. In the cross-sectional area, the length between the first surface and the low-gloss portion is measured every 25 μm in a width direction of the decorative sheet. For example, the thickness is measured at 20 points in a cross-sectional area with a width of 500 μm.

(X2) The measurement of the thickness described in (X1) is performed on the cross-sectional areas of additional 9 fields of view.

(X3) An arithmetic mean of all the measurements of the thickness taken in the cross-sectional areas of the 10 fields of view is determined as the average length between the first surface and the low-gloss portion.

The average length between the first surface S1 and the design layer 30 of the decorative sheet 20, which is, in other words, an average thickness of the binder resin 41 in the second region A2, is also determined in steps corresponding to (X1) to (X3), described above.

<<First Particles>>

The first particles 43 impart a tactile feel to the first surface S1. An average particle size and a ratio of the first particles 43 may be determined in consideration of a desired tactile feel. The average particle size of the first particles 43 is, for example, 3 μm or greater and 12 μm or less and preferably 4 μm or greater and 9 μm or less. Because of the sufficiently large average particle size of the first particles 43, some of the first particles 43 project from the binder resin 41 to form the first surface S1 of the decorative sheet 20. The first particles 43 improve the tactile feel provided by the first surface S1 of the decorative sheet 20. In the first region A1, because of the low-gloss portion 25 provided therein, the first particles 43 can easily project from the binder resin 41. A significant difference in the tactile feel can be produced between the first region A1 and the second region A2. The size of the first particles 43 is not too large to be held by the binder resin 41 and, therefore, can inhibit the first particles 43 from being separated from the binder resin 41.

The average particle size of the first particles 43 is determined in the following manner. The first surface S1 of the decorative sheet 20 is magnified with a transmission electron microscope or a scanning electron microscope to examine individual first particles 43. In the examined first particles 43, the particle size of the individual first particles 43 is measured. In instances where a first particle 43 has a minor axis length and a major axis length, an average of these is determined as the particle size of the first particle 43. In instances where first particles 43 form an aggregate, the particle size of the first particles 43 is a diameter of an inscribed circle of the aggregated portion. The measurement of the particle size is performed on 100 first particles 43, and an average of the measurements is determined as the "average particle size of the first particles 43".

The average particle size of the first particles 43 is greater than the average length between the first surface S1 and the low-gloss portion 25. The first particles 43 can easily project from the binder resin 41 in the first region A1 in which the low-gloss portion 25 is provided. The number of first particles 43 that project from the binder resin 41 in a location that overlaps the first region A1 is greater than the number of first particles 43 that project from the binder resin 41 in a location that overlaps the second region A2. A significant difference in the tactile feel can be produced between the first region A1 and the second region A2.

Figure 3:
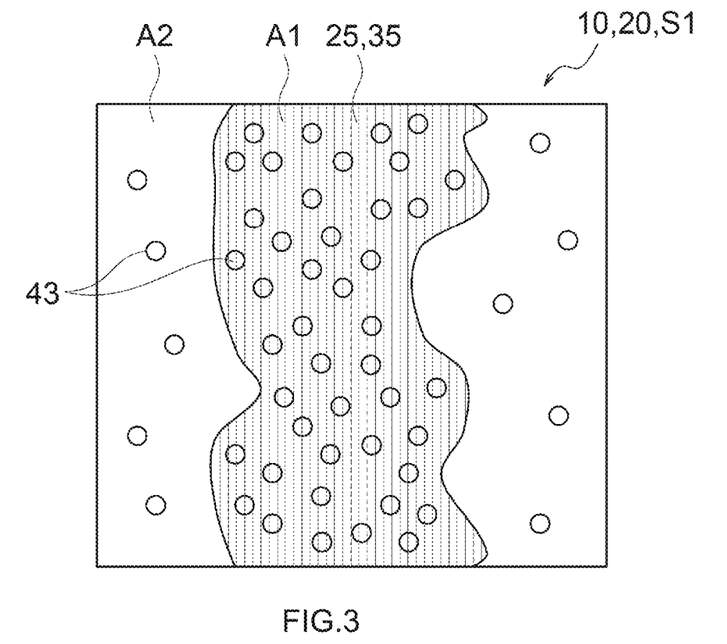
FIG. 3 is an enlarged partial plan view of a decorative member of an embodiment.

FIG. 3 is an enlarged partial plan view of the decorative sheet 20 according to an embodiment. FIG. 3 illustrates the first surface S1 of the decorative sheet 20. In the example illustrated in FIG. 3, a texture of wood, which is a natural object, has been imparted to the decorative sheet 20. The decorative sheet 20 has a pattern and a tactile feel of wood imparted thereto. The first region A1 shows a pattern of vessels of wood, and the second region A2 shows a pattern other than the pattern of vessels of wood, on the first surface S1. The number of first particles 43 that project from the binder resin 41 in a location that overlaps the first region A1 is greater than the number of first particles 43 that project from the binder resin 41 in a location that overlaps the second region A2. The portion on which the pattern of vessels is shown has a tactile feel different from that of the portion on which a pattern other than the pattern of vessels is shown. In particular, the portion on which the pattern of vessels is shown has a stronger tactile feel than the portion on which a pattern other than the pattern of vessels is shown.

As a result of the projection of the first particles 43 from the binder resin 41, the first surface S1 is formed to be an uneven surface. Since the first particles 43 can easily project from the binder resin 41 in the first region A1, the uneven surface formed in the first region A1 is stronger than that in the second region A2. As a result, the average skewness and the average kurtosis of the first region A1 is greater than the average skewness and the average kurtosis of the second region A2.

Examples of the first particles 43 include resin particles and inorganic particles. The first particles 43 may include both resin particles and inorganic particles. The first particles 43 may have any shape and preferably has a spherical shape. The first particles 43 may have an irregular shape.

The resin particles that are used as first particles 43 may include at least one resin, examples of which include polymethylmethacrylate, polyacrylic-styrene copolymers, melamine resins, urethane resins, polyamide resins, such as nylons, polycarbonates, polystyrenes, polyvinyl chlorides, benzoguanamine-melamine-formaldehyde condensates, silicone resins, fluorine-based resins, and polyester-based resins. The inorganic particles that are used as first particles 43 may include at least one inorganic material, examples of which include silicas, aluminas, zirconias, and titanias. Preferably, the first particles 43 are silica particles.

A content of the first particles 43 is preferably 15 parts by mass or greater and 30 parts by mass or less and more preferably 20 parts by mass or greater and 23 parts by mass or less, per 100 parts by mass of the binder resin 41. In such cases, the gloss of the decorative sheet 20 can be suppressed while a good tactile feel of the decorative sheet 20 is achieved. Furthermore, a reduction in a strength of the surface protective layer 40 can be inhibited.

The surface protective layer 40 may include one or more additives if necessary. Examples of the additives include antioxidants, UV absorbers, light stabilizers, and leveling agents.

The surface protective layer 40 can be produced, for example, by applying a composition for a surface protective layer to the design layer 30, drying the composition, and, if necessary, curing the composition. The composition for a surface protective layer includes materials that form the surface protective layer (e.g., a binder resin and particles B) and may include a solvent and the like, which may be added if necessary.

<Low-Gloss Portion>

The low-gloss portion 25 reduces the gloss of the design formed by the design layer 30. In other words, the low-gloss portion 25 makes the design formed by the design layer 30 matte. The low-gloss portion 25 can reduce the specular glosses of the first surface S1 of the decorative sheet 20, thereby improving the design that is shown by the decorative sheet 20. The low-gloss portion 25 is transparent. The low-gloss portion 25 overlaps the patterned portion 35. The low-gloss portion 25 is provided only in the first region A1. The low-gloss portion 25 reduces the gloss of the design that is shown by the decorative sheet 20, in the first region A1 and its vicinity. The portion with a reduced gloss is visually perceived as a recess by viewers. The first region A1 is visually perceived as a recess. Relatively, the second region A2 is visually perceived as a projection. Because of the low-gloss portion 25, the design shown by the decorative sheet 20 is visually perceived as an uneven pattern. In instances where the decorative sheet 20 shows a design of a wood product, such as a veneer sheet or a plywood sheet, a pattern of vessels can be represented by the low-gloss portion 25. The design that is shown by the decorative sheet 20 can be made to be similar to a tree that is a natural object.

An ink composition that forms the low-gloss portion 25 has a property of, for example, being able to experience interactions, such as dissolving, dispersing, and combining, with the ionizing radiation-curable resin composition that forms the binder resin 41 of the surface protective layer 40. The ink composition that forms the low-gloss portion 25 is appropriately selected in association with the ionizing radiation-curable resin composition (uncured product). Specifically, the ink composition is preferably an ink composition including, as a binder resin, a non-crosslinked resin, preferred examples of which include thermoplastic (non-crosslinked) urethane resins. From the standpoint of enhancing the interactions with the ionizing radiation-curable resin composition that forms the binder resin 41 of the surface protective layer 40, thereby obtaining an increased difference in the gloss between patterns, it is more preferable that a content of the urethane resin be greater than or equal to 50 mass %. Preferably, the urethane resin that may be selected is a non-crosslinked resin, that is, a thermoplastic resin having a linear molecular structure rather than a three-dimensional network molecular structure resulting from three-dimensional crosslinking. Examples of such non-crosslinked urethane resins include urethane resins formed by reacting a polyol component with an isocyanate component, with the polyol component being a polyol such as an acrylic polyol, a polyester polyol, or a polyether polyol and the isocyanate component being an isocyanate that is an aromatic isocyanate such as tolylene diisocyanate, xylene diisocyanate, or diphenylmethane diisocyanate, or is an aliphatic or alicyclic isocyanate such as isophorone diisocyanate, hexamethylene diisocyanate, or hydrogenated tolylene diisocyanate. Typically, the number of hydroxy groups per molecule in the polyol and the number of isocyanate groups per molecule in the isocyanate are each two on average. Furthermore, the urethane resin may have an average molecular weight of approximately 10,000 to 50,000 and a glass transition temperature (Tg) of approximately −70 to −40° C. Such a urethane resin is preferable in terms of the creation of interaction sites.

If necessary, the ink composition may include a saturated or unsaturated polyester resin, acrylic resin, a vinyl chloride-vinyl acetate copolymer, or the like, so that the degree of the creation of interaction sites can be adjusted. Among these, polyester resins are preferable, and unsaturated polyester resins are particularly preferable. Preferably, an amount of addition of the unsaturated polyester resin is within a range of 10 to 50 mass % based on a total mass of the binder resin in the ink composition. When the amount is within the range, a sufficient effect of enhancing the creation of interaction sites can be produced. The unsaturated polyester resin is not particularly limited as long as it is a reaction product of an unsaturated dicarboxylic acid and a glycol. Examples of the unsaturated dicarboxylic acid include maleic acid, fumaric acid, and itaconic acid, and examples of the glycol include ethylene glycol, diethylene glycol, propylene glycol, and butylene glycol.

Regarding the low-gloss portion 25, it is preferable that the ink composition include inorganic particles. The inorganic particles are, for example, silica particles. The inorganic particles have an average particle size of 0.1 μm or greater and 5 μm or less. The average particle size of the inorganic particles is determined by magnifying the first surface S1 of the decorative sheet 20 with a transmission electron microscope or a scanning electron microscope and examining the surface, as with the average particle size of the first particles 43, described above.

The inorganic particles scatter light that enters the low-gloss portion 25. Light that enters the inside from the first surface S1 of the decorative sheet 20 is reflected by the design layer 30 and then passes through the low-gloss portion 25. Since the light that passes through the low-gloss portion 25 is scattered by the inorganic particles, the design shown by the decorative sheet 20 has a reduced gloss. This is believed to be a reason that the low-gloss portion 25 can reduce the gloss. Note that the reason that the gloss is reduced by the low-gloss portion 25 is not limited to the reason just described.

The inorganic particles can impart thixotropic properties to the ink composition, and, consequently, the ink composition can retain a shape when the low-gloss portion is printed with a plate. As a result, a sharpness of the uneven shape at locations at which the projection changes to the recess can be emphasized, and, consequently, a well-defined representation of a design is made possible. In instances where the particle size of the inorganic particles is 0.1 μm or greater, the thixotropic properties of the ink are not extremely enhanced when the inorganic particles are added to the ink composition, a viscosity of the ink does not increase excessively, and, consequently, printing can be easily controlled.

Preferably, a content of the inorganic particles in the ink composition is 5 mass % or greater and 15 mass % or less. When the content is 5 mass % or greater, sufficient thixotropic properties can be imparted to the ink composition. When the content is 15 mass % or less, the viscosity of the ink composition can be appropriately maintained, and, consequently, it is possible to inhibit a reduction in productivity for the low-gloss portion 25 and degradation of the surface properties of the low-gloss portion 25.

Preferably, an amount of application of the ink composition that forms the low-gloss portion is 1 g/m² or greater and 50 g/m² or less. When the amount of application is 1 g/m² or greater, the above-described interactions between the ink composition and the ionizing radiation-curable resin composition occur, and sufficient interaction sites can be obtained; consequently, the gloss can be sufficiently reduced. When the amount of application is 50 g/m² or less, mechanical restrictions are not necessary for the printing of the ink composition, and in addition, an economical advantage can be obtained. The amount of application of the ink composition is preferably 1 g/m² or greater and 10 g/m² or less and more preferably 1 g/m² or greater and 7 g/m² or less.

In the present embodiment, the low-gloss portion 25 does not directly deform the first surface S1 of the decorative sheet 20. In particular, the low-gloss portion 25 does not raise the binder resin 41 of the surface protective layer 40.

In instances where the decorative sheet 20 shows a design of a wood grain, the patterned portion 35 forms a vessel pattern, as described above. Because of the overlap of the low-gloss portion 25 with the patterned portion 35, the gloss of the vessel pattern can be reduced.

<First Surface>

As described above, in the decorative sheet 20 of the present embodiment, the first surface S1, which is constituted by the surface protective layer 40, has average specular glosses, average skewnesses, and average kurtosises that are adjusted as follows.

An average 60° specular gloss measured on the first surface S1: 6 or less

An average 85° specular gloss measured on the first surface S1: 9 or less

A relationship between an average skewness Ssk1 of the first region A1 and an average skewness Ssk2 of the second region A2: $0<Ssk2<Ssk1<1$ A relationship between an average kurtosis Sku1 of the first region A1 and an average kurtosis Sku2 of the second region A2: $3<Sku2<Sku1<5$ The first surface S1 of the decorative sheet 20 has a shape reflecting the shape of the first particles 43. The first particles 43 can significantly change the 85° specular gloss rather than a 20° specular gloss or the 60° specular gloss. This is believed to be because the reflection on the first particles 43 has a strong influence. A luster of the decorative sheet 20 is a result of reflection on the first surface S1 of the decorative sheet 20. Because of the first particles 43 of the first surface S1 of the decorative sheet 20, the 85° specular gloss of the first surface S1 of the decorative sheet 20 is reduced, and thus, the luster of the decorative sheet 20 can be controlled to reduce the gloss. A texture similar to that of a natural object, such as a veneer sheet or a plywood sheet, can be imparted to the decorative sheet 20.

The first surface S1 having the above-described shape and properties can be obtained, for example, due to a decorative sheet 20 having the above-described configuration. The first surface S1 having the above-described shape and properties may be obtained due to a decorative sheet 20 having a different configuration.

The first surface S1 having the above-described shape and properties has a low gloss as a whole. The first surface S1 has appropriate tactile feels as a whole. In particular, the first region A1 has a stronger tactile feel than the second region A2. The design layer 30 includes the patterned portion 35 in the first region A1. The patterned portion 35 differentiates the first region A1 from the second region A2 in terms of appearance attributes, such as a color. Different tactile feels are imparted for the different appearance attributes. The tactile feels imparted are appropriate and suit the design that is shown by the decorative sheet 20. Thus, regarding the decorative sheet 20 of the present embodiment, the decorative sheet 20 can have appropriate tactile feels and also have a reduced gloss.

The average specular glosses, the average skewness, and the average kurtosis of the first surface S1 of the decorative sheet 20 will be described below in order.

<Specular Glosses>

The specular glosses are measured in accordance with JIS Z 8741:1997, by using a micro-TRI-gloss (Cat. No. 4563), manufactured by BYK-Gardner. The 60° specular gloss is a value obtained by performing a measurement with an incident angle of 60°, in accordance with Method 3 described in JIS Z 8741:1997. The 85° specular gloss is a value obtained by performing a measurement with an incident angle of 85°, in accordance with Method 1 described in JIS Z 8741:1997. The incident angle is an angle between a direction normal to an incident surface and an optical path of incident light and is a value less than or equal to 90°. The specular glosses of the first surface S1 are specular glosses measured on the first surface S1, which serves as the incident surface.

The specular glosses are measured on 1-cm square areas of the first surface S1 of the decorative sheet 20. The specular glosses of the first surface S1 are measured in 10 areas, and averages of the measurements of the 10 areas are determined as the average specular glosses. The 10 areas in which the specular glosses are measured include an area or areas of the first region A1 and an area or areas of the second region A2, in proportions that correspond to the proportions of the first region A1 and the second region A2 on the first surface S1. For example, in an instance where the first region A1 accounts for 70% of the first surface S1, and the second region A2 accounts for 30% of the first surface S1, the specular glosses are measured in 7 areas in the first region A1 of the first surface S1 and in 3 areas in the second region A2 of the first surface S1. Averages of these are determined as the specular glosses of the first surface S1.

When the 60° specular gloss is 6 or less, and the 85° specular gloss is 9 or less, as measured on the first surface S1, the first surface S1 has an appropriately reduced gloss, and thus, the decorative sheet 20 shows an excellent design, for example, a faithful reproduction of a natural material, such as a wood grain.

<Skewness>

The skewness is defined in ISO 25178-2:2012. The skewness is one of the three-dimensional surface texture parameters defined in ISO. The skewness is an index representing the degree of deviation in a height profile with respect to a mean plane. When the skewness is 0, a surface profile is symmetrical about the mean height plane. The surface profile has a normal distribution with a skewness of 0. When the skewness is greater than 0, the surface profile is skewed downward from the mean height plane. That is, when the peaks or projections are sharp and thin at or near their tops, the skewness is greater than 0. In other words, when an opening portion or a nearby portion of the valleys or the recesses has a thick opening, the skewness is greater than 0. When the skewness is less than 0, the surface profile is skewed upward from the mean height plane. That is, when the peaks or projections are thick at or near their tops, the skewness is less than 0. In other words, when an opening portion or a nearby portion of the valleys or the recesses has a thin opening, the skewness is less than 0.

When the average skewness Ssk1 of the first region A1 and the average skewness Ssk2 of the second region A2 on the first surface S1 are 0 or less, the first surface S1 does not provide a feel of a recess and has a tactile feel similar to that of a plastic. When the average skewness Ssk1 of the first region A1 and the average skewness Ssk2 of the second region A2 on the first surface S1 are 1 or greater, the first surface S1 feels excessively rough. Because of the average skewness Ssk1 of the first region A1 that is greater than the average skewness Ssk2 of the second region A2, the first region A1, in which appearance attributes, such as a color, are differentiated by the patterned portion 35, can have a tactile feel stronger than that of the second region A2. The first surface S1 can have appropriate tactile feels that are, for example, a faithful reproduction of the tactile feels of a natural material, such as a wood grain, and correspond to the design. Hence, when the average skewness Ssk1 of the first region A1 and the average skewness Ssk2 of the second region A2 on the first surface S1 satisfy a relationship (i), shown below, the first surface S1 can have appropriate tactile feels that are, for example, a faithful reproduction of the tactile feels of a natural material, such as a veneer sheet or a plywood sheet, and correspond to the design.

$$0 < Ssk2 < Ssk1 < 1 \qquad \text{(i)}$$

<Kurtosis>

The kurtosis is defined in ISO 25178-2:2012. The kurtosis is one of the three-dimensional surface texture parameters defined in ISO. The kurtosis is an index representing the degree of sharpness in a height profile with respect to a mean plane. When the kurtosis is 3, the height profile is a profile of a normal distribution. When the kurtosis is greater than 3, the height profile has a sharp shape. When the kurtosis is less than 3, the height profile has a collapsed shape.

When the average kurtosis Sku1 of the first region A1 and the average kurtosis Sku2 of the second region A2 on the first surface S1 are 3 or less, the first surface S1 does not provide a feel of unevenness and has a tactile feel similar to that of a plastic. When the average kurtosis Sku1 of the first region A1 and the average kurtosis Sku2 of the second region A2 on the first surface S1 are 5 or greater, the first surface S1 feels excessively rough. Because of the average kurtosis Sku1 of the first region A1 that is greater than the average kurtosis Sku2 of the second region A2, the first region A1, in which appearance attributes, such as a color, are differentiated by the patterned portion 35, can have a tactile feel stronger than that of the second region A2. The first surface S1 can have appropriate tactile feels that are, for example, a faithful reproduction of the tactile feels of a natural material, such as a wood grain, and correspond to the design. When the average kurtosis Sku1 of the first region A1 and the average kurtosis Sku2 of the second region A2 on the first surface S1 satisfy a relationship (ii), shown below, the first surface S1 can have appropriate tactile feels that are, for example, a faithful reproduction of the tactile feels of a natural material, such as a veneer sheet or a plywood sheet, and correspond to the design.

$$3 < Sku2 < Sku1 < 5 \qquad \text{(ii)}$$

The skewness and kurtosis are measured with a profile-analyzing laser microscope, and the measurement is performed on rectangular areas on the first surface S1 of the decorative sheet 20. The rectangular areas have a size of approximately 1402 µm×1051 µm. The surface profile is measured in randomly selected 20 areas, and averages of the measurements of the 20 areas are determined as the average skewnesses and the average kurtosises. The following measurement conditions are used.

Objective lens: 10×, laser wavelength: 661 nm, measurement mode: surface profile mode, step size: 1.6 µm, measurement quality: high speed mode The average specular glosses, the average skewnesses, and the average kurtosises can be adjusted by adjusting the content of the first particles 43 of the surface protective layer 40, the average particle size of the first particles 43, the average length between the first surface S1 and the low-gloss portion 25, and/or the like, as described above. An effective way to adjust the average specular glosses, the average skewnesses, and the average kurtosises such that they fall within the above-mentioned ranges is to set the content of the first particles 43 of the surface protective layer 40, the average particle size of the first particles 43, and the average length between the first surface S1 and the low-gloss portion 25 such that they fall within the above-mentioned ranges. The average specular glosses, the average skewnesses, and the average kurtosises may be adjusted in a different manner.

<Applications>

The decorative member 10 and the decorative sheet 20 of the present disclosure can be used in various applications. Examples of specific applications include those listed below in (1) to (9).

(1) Surface members for interior portions of buildings, such as walls, floors, and ceilings, with the buildings including houses, offices, stores, hospitals, and clinics (2) Surface members for exterior portions of buildings, such as outer walls, roofs, soffits, and cases for sliding doors, with the buildings including houses, offices, stores, hospitals, and clinics (3) Surface members for fittings (interior or exterior portions), such as windows, window frames, doors, and door frames; surface members for fitting accessories (e.g., handles); and surface members for fitting jigs (4) Surface members for fixture members, such as hand rails, spandrel walls, moldings, thresholds, lintels, and copings (5) Surface members for outdoor (exterior) portions, such as walls, gates, posts of clothes drying racks, and hand rails (6) Surface members for pieces of furniture, such as chests of drawers, desks, chairs, cupboards, and sinks in kitchens; surface members for furniture accessories (e.g., handles); and surface members for furniture jigs (7) Surface members for enclosures or the like of various home appliances, such as television receivers, radio receivers, refrigerators, microwave ovens, washing machines, fans, and air conditioners; surface members for home appliance accessories (e.g., handles, switches, and touch panels); and surface members for home appliance jigs (8) Surface members for office equipment, such as electronic copy machines, facsimile machines, printers, and various computers, such as personal computers; surface members for enclosures of various office equipment, such as ATM machines in financial institutions, such as banks and post offices; surface members for accessories (e.g., keyboards and touch panels) of various office equipment; and surface members for jigs for various office equipment (9) Surface members for interior or exterior portions (walls, floors, ceilings, hand rails, pillars, control panels, and control mechanisms, such as levers, handles, and steering wheels) of vehicles such as automobiles, rolling stocks such as railway vehicles, ships, and aircraft.

EXAMPLES

The present disclosure will be described in more detail with reference to Examples. The present disclosure is not limited to the Examples described below.

1. Preparation of Decorative Member

Example 1

The substrate used was colored building paper (CHPS45 (model number), basis weight: 45 g/m², manufactured by Tentok Corporation). A colored layer having a thickness of 5 μm was formed by applying a resin composition by gravure printing to a surface of the substrate, which was a surface having undergone an adhesion-enhancing treatment. The resin composition included a resin mixture of an acrylic resin and a urethane resin as a binder and included titanium white, red iron oxide, and chrome yellow as colorants. Next, a patterned portion with a wood grain pattern was formed with a resin composition on the colored layer in the first region. The resin composition included cellulose nitrate as a binder and included a colorant containing red iron oxide as a major component. The wood grain pattern was a pattern of vessels. The colored layer and the patterned portion formed a design layer on the substrate.

Next, a primer layer having a thickness of 5 μm was formed by applying a composition for a primer layer to an entire upper surface of the design layer and drying the composition. The composition for a primer layer included a two-component curable resin (base resin: an acrylic polyol, curing agent: hexamethylene diisocyanate).

Next, a low-gloss portion was formed on the primer layer in the first region by gravure printing. The composition for the low-gloss portion included a thermoplastic (non-cross-linked) urethane resin and silica. The low-gloss portion was formed to overlap the patterned portion.

Next, a composition for a surface protective layer was applied by roll coating to cover an entire area including the first region, in which the low-gloss portion was formed, and the second region, in which the low-gloss portion was not formed, and the resultant was irradiated with an electron beam (accelerated voltage: 175 KeV, 5 Mrad (50 kGy)). The composition for the surface protective layer contained 21 parts by mass of spherical silica particles per 100 parts by mass of an electron beam-curable multifunctional acrylate resin. The irradiation with an electron beam cured the uncured resin layer to form the surface protective layer. Subsequently, heat curing was performed at 70° C. for 24 hours to afford a decorative sheet of Example 1. The surface protective layer contained the binder resin and first particles having an average particle size of 9 μm. The binder resin had an average thickness of 8 μm in the first region.

Example 2

A decorative sheet of Example 2 was prepared as in Example 1, except that the composition for the surface protective layer was replaced. Regarding the decorative sheet of Example 2, the composition for the surface protective layer contained 22 parts by mass of spherical silica particles per 100 parts by mass of the electron beam-curable multifunctional acrylate resin. The surface protective layer prepared from the composition for the surface protective layer contained the binder resin and first particles having an average particle size of 9 μm. The binder resin had an average thickness of 8 μm in the first region.

Comparative Example 1

A decorative sheet of Comparative Example 1 was prepared as in Example 1, except that the composition for the surface protective layer was replaced. Regarding the decorative sheet of Comparative Example 1, the composition for the surface protective layer contained 15 parts by mass of spherical silica particles per 100 parts by mass of the electron beam-curable multifunctional acrylate resin. The surface protective layer prepared from the composition for the surface protective layer contained the binder resin and first particles having an average particle size of 4 μm. The binder resin had an average thickness of 4 μm in the first region.

Comparative Example 2

A decorative sheet of Comparative Example 2 was prepared as in Example 1, except that the composition for the surface protective layer was replaced and that a raised portion was additionally formed. The raised portion was formed by applying, by gravure printing, a composition for a raised portion onto the primer layer in the first region and drying the composition. The composition for a raised portion contained 25 parts by mass of spherical polymethylmethacrylate particles per 100 parts by mass of a two-component curable resin. The raised portion contained the binder resin and particles having an average particle size of 20 μm. The raised portion had a thickness of 18 to 25 μm.

Regarding the decorative sheet of Comparative Example 2, the composition for the surface protective layer contained 15 parts by mass of spherical silica particles per 100 parts by mass of the electron beam-curable multifunctional acrylate resin. The surface protective layer prepared from the composition for the surface protective layer contained the binder resin and first particles having an average particle size of 4 μm. The binder resin had an average thickness of 4 μm in the first region.

Comparative Example 3

A decorative sheet of Comparative Example 3 was prepared as in Example 1, except that the composition for the surface protective layer was replaced. Regarding the decorative sheet of Comparative Example 3, the composition for the surface protective layer contained 20 parts by mass of spherical silica particles per 100 parts by mass of the electron beam-curable multifunctional acrylate resin. The surface protective layer prepared from the composition for the surface protective layer contained the binder resin and first particles having an average particle size of 4 μm. The binder resin had an average thickness of 4 μm in the first region.

Comparative Example 4

A decorative sheet of Comparative Example 4 was prepared as in Example 1, except that the composition for the surface protective layer was replaced. Regarding the decorative sheet of Comparative Example 4, the composition for the surface protective layer contained 20 parts by mass of spherical silica particles per 100 parts by mass of the electron beam-curable multifunctional acrylate resin. The surface protective layer prepared from the composition for the surface protective layer contained the binder resin and first particles having an average particle size of 4 μm. The binder resin had an average thickness of 8 μm in the first region.

Comparative Example 5

A decorative sheet of Comparative Example 5 was prepared as in Example 1, except that the composition for the surface protective layer was replaced. Regarding the decorative sheet of Comparative Example 5, the composition for the surface protective layer contained 25 parts by mass of spherical silica particles per 100 parts by mass of the electron beam-curable multifunctional acrylate resin. The surface protective layer prepared from the composition for the surface protective layer contained the binder resin and first particles having an average particle size of 9 μm. The binder resin had an average thickness of 8 μm in the first region.

Comparative Example 6

A decorative sheet of Comparative Example 6 was prepared as in Example 1, except that the composition for the surface protective layer was replaced. Regarding the decorative sheet of Comparative Example 6, the composition for the surface protective layer contained 18 parts by mass of spherical silica particles per 100 parts by mass of the electron beam-curable multifunctional acrylate resin. The surface protective layer prepared from the composition for the surface protective layer contained the binder resin and first particles having an average particle size of 9 μm. The binder resin had an average thickness of 8 μm in the first region.

2. Measurements

Measurements were performed on the decorative sheets of the Examples and the Comparative Examples. The atmosphere for each measurement had a temperature of 23±5° C. and a relative humidity of 40% or greater and 65% or less. Prior to the start of each measurement, the subject sample was exposed to the atmosphere for 30 minutes or more before being measured.

2-1. Specular Glosses

In the decorative sheets obtained in the Examples and the Comparative Examples, the 60° specular gloss and the 85° specular gloss of the first surface were measured. The measuring device used to measure the specular glosses was a micro-TRI-gloss (Cat. No. 4563), manufactured by BYK-Gardner. The 60° specular gloss was measured in accordance with Method 3 described in JIS Z 8741:1997, and the 85° specular gloss was measured in accordance with Method 1 described in JIS Z 8741:1997. The measurement area per measurement was a 1-cm square area. The measurements were performed on 10 areas, and averages of the measurements obtained from the measurement of 10 areas were determined as the average 60° specular gloss and the average 85° specular gloss for each of the Examples and the Comparative Examples.

2-2. Skewness and Kurtosis

In the decorative sheets obtained in the Examples and the Comparative Examples, the skewness and the kurtosis were measured in each of the first region and the second region. The skewness that was measured was in accordance with the definition in ISO 25178-2:2012, and the kurtosis that was measured was in accordance with the definition in ISO 25178-2:2012.

The measuring device used was a profile-analyzing laser microscope (VK-X1000 (control unit)/VK-X1050 (measurement unit), manufactured by Keyence Corporation). The measurement conditions were as follows. The measurement area per measurement was a 1402 μm×1051 μm area. The measurements were performed 20 times, and averages of the measurements obtained from the 20 measurement runs were determined as the average skewnesses and the average kurtosises of the first region and the second region for each of the Examples and the Comparative Examples.

<Measurement Conditions>
  Objective lens: 10×, laser wavelength: 661 nm, measurement mode: surface profile mode, step size: 1.6 μm, measurement quality: high speed mode 3. Evaluations The decorative sheets of the Examples and the Comparative Examples were evaluated. The atmosphere for each evaluation had a temperature of 23±5° C. and a relative humidity of 40% or greater and 65% or less. Prior to the start of each evaluation, the subject sample was exposed to the atmosphere for 30 minutes or more before being evaluated.

3-1. Tactile Feel 20 subjects evaluated the tactile feel of the decorative sheets obtained in the Examples and the Comparative Examples. Of the 20 subjects, 5 were in their twenties, 5 in their thirties, 5 in their forties, and 5 in their fifties. Each of the subjects touched the first surface of the decorative sheet with the ball of the index finger of the dominant hand and evaluated whether the tactile feel was excellent. The criteria for evaluating the tactile feel were "whether recesses and projections are strongly felt" and "whether the tactile feel is different between the first region and the second region, and the tactile feel feels natural". The evaluations were classified as follows according to the criteria.
  A: 18 or more of the 20 subjects said that the tactile feel was excellent.
  B: 15 or more and 17 or less of the 20 subjects said that the tactile feel was excellent.
  C: 11 or more and 14 or less of the 20 subjects said that the tactile feel was excellent.
  D: 10 or less of the 20 subjects said that the tactile feel was excellent.

3-2. Feel of Low Gloss 20 subjects evaluated the gloss of the decorative sheets obtained in the Examples and the Comparative Examples. Of the 20 subjects, 5 were in their twenties, 5 in their thirties, 5 in their forties, and 5 in their fifties. Each of the subjects visually examined the first surface of the decorative sheet and evaluated whether the gloss was sufficiently suppressed. The evaluation was performed under illumination by a fluorescent lamp in a room in which light from outside was blocked. The evaluations were classified as follows according to the criteria.
  A: 18 or more of the 20 subjects said that the gloss was low.
  B: 15 or more and 17 or less of the 20 subjects said that the gloss was low.
  C: 11 or more and 14 or less of the 20 subjects said that the gloss was low.
  D: 10 or less of the 20 subjects said that the gloss was low.

The constitutions, measurement results, and evaluation results of the Examples and the Comparative Examples are shown in Table 1 below.

| | Average Thickness of Binder Resin in First Region (μm) | Parts by Mass of First Particles | Average Particle Size of First Particles (μm) | 60° Gloss Value | 85° Gloss Value | Skewness of First Region | Skewness of Second Region | Kurtosis of First Region | Kurtosis of Second Region | Evaluation of Tactile Feel | Evaluation of Gloss |
|---|---|---|---|---|---|---|---|---|---|---|---|
| Example 1 | 8 | 21 | 9 | 5.4 | 7.3 | 0.2 | 0.1 | 4.0 | 3.5 | A | A |
| Example 2 | 8 | 22 | 9 | 5.3 | 5.8 | 0.6 | 0.1 | 4.8 | 3.6 | A | A |
| Comparative Example 1 | 4 | 15 | 4 | 5 | 8.9 | 0.0 | −0.5 | 4 | 4.8 | C | A |
| Comparative Example 2 | 4 | 15 | 4 | 5.2 | 10.7 | 1.1 | −0.8 | 5.3 | 6.8 | B | B |
| Comparative Example 3 | 4 | 20 | 4 | 3.3 | 7.5 | 0.1 | −0.7 | 3.6 | 4.6 | C | A |
| Comparative Example 4 | 8 | 20 | 4 | 8.5 | 11.4 | 0.8 | 0.1 | 4.2 | 3.0 | B | C |
| Comparative Example 5 | 8 | 25 | 9 | 4.1 | 3.7 | 1.2 | 0.2 | 7.2 | 4.1 | C | A |
| Comparative Example 6 | 8 | 18 | 9 | 8.3 | 11.7 | 0.4 | 0.1 | 3.9 | 3.2 | B | B |

As will be appreciated from the results of the measurements and evaluations shown in Table 1, when the average 60° specular gloss was 6 or less, and the average 85° specular gloss was 9 or less, the results of the evaluation of the gloss were favorable. When the average skewness Ssk1 of the first region and the average skewness Ssk2 of the second region on the first surface satisfied the relationship (i), and, the average kurtosis Sku1 of the first region and the average kurtosis Sku2 of the second region on the first surface satisfied the relationship (ii), the results of the evaluation of the tactile feel were favorable.

$$0 < Ssk2 < Ssk1 < 1 \quad \text{(i)}$$

$$3 < Sku2 < Sku1 < 5 \quad \text{(ii)}$$

When the skewness of the first region was greater than the skewness of the second region, and the kurtosis of the first region was greater than the kurtosis of the second region, the results of the evaluation of the tactile feel were favorable.

REFERENCE SIGNS LIST 10 decorative member
15 support member
20 decorative sheet
21 substrate
23 primer layer
25 low-gloss portion
30 design layer
31 colored layer
35 patterned portion
40 surface protective layer
41 binder resin
43 first particle

The invention claimed is:

1. A decorative sheet comprising a first surface and a second surface positioned opposite to the first surface, wherein
the first surface comprises a first region and a second region that is different from the first region,
the decorative sheet comprises a surface protective layer, a design layer, and a substrate in order from the first surface toward the second surface,
the design layer comprises a patterned portion disposed only in a location that overlaps the first region,
an average 60° specular gloss measured on the first surface is 6 or less,
an average 85° specular gloss measured on the first surface is 9 or less,
an average skewness Ssk1 of the first region and an average skewness Ssk2 of the second region, in accordance with a definition in ISO 25178-2:2012, satisfy a relationship (i), shown below, and
an average kurtosis Sku1 of the first region and an average kurtosis Sku2 of the second region, in accordance with a definition in ISO 25178-2:2012, satisfy a relationship (ii), shown below $$0 < Ssk2 < Ssk1 < 1 \quad \text{(i)}$$

$$3 < Sku2 < Sku1 < 5. \quad \text{(ii)}$$

2. The decorative sheet according to claim 1, further comprising a low-gloss portion that overlaps the patterned portion, wherein
the surface protective layer comprises a binder resin and first particles held by the binder resin.

3. The decorative sheet according to claim 2, wherein the low-gloss portion comprises inorganic particles.

4. The decorative sheet according to claim 2, wherein some of the first particles project from the binder resin.

5. The decorative sheet according to claim 4, wherein a number of first particles that project from the binder resin in a location that overlaps the first region is greater than a number of first particles that project from the binder resin in a location that overlaps the second region.

6. The decorative sheet according to claim 2, wherein an average particle size of the first particles is greater than an average length between the first surface and the low-gloss portion.

7. The decorative sheet according to claim 2, wherein an average length between the first surface and the low-gloss portion is 3 μm or greater and 12 μm or less.

8. The decorative sheet according to claim 1, wherein the substrate comprises paper.

9. The decorative sheet according to claim 8, further comprising a primer layer disposed between the substrate and the surface protective layer.

10. A decorative member comprising:
the decorative sheet according to claim 1; and
a support member supporting the decorative sheet.

* * * * *